Patented May 16, 1933

1,909,483

UNITED STATES PATENT OFFICE

AUGUSTE FLORENTIN BIDAUD, OF ROUSSILLON, FRANCE, ASSIGNOR TO E. I. DU PONT DE NEMOURS & COMPANY, OF WILMINGTON, DELAWARE, A CORPORATION OF DELAWARE

PROCESS OF CHANGING THE SOLUBILITY OF CELLULOSE ACETATE

No Drawing. Application filed July 11, 1929, Serial No. 377,614, and in Great Britain July 12, 1928.

The present invention relates to a process for modifying or developing the solubility of cellulose acetates soluble in anhydrous or aqueous phenols or polyphenols.

This process consists in dissolving cellulose acetates in a phenolic solution such as anhydrous or aqueous phenols or polyphenols, and in partly saponifying them by the action of an alkaline compound dissolved in this solution. Numerous alkaline compounds may be used. As examples, may be mentioned the phenates including the alkaline compounds of the monohydric and polyhydric phenols and derivatives thereof, such as ordinary phenol, resorcinol and cresol. These alkaline compounds may be introduced before or after the solution of the cellulosic ester and, if desired, diluents may be added to the reacting solvent medium. The temperature at which the operation is carired out may vary between very wide limits. Temperatures between 30° and 70° C. give good results, but it is quite possible to operate at higher temperatures or in the cold. It has been discovered that owing to the action of the alkaline compound, the cellulose acetates are gradually saponified and that their solubility characteristics are simultaneously modified. By carrying out the instant process, it is possible to obtain, for example, products which are soluble in acetic acid from products which are insoluble in acetic acid; products which are soluble in acetone from products which are not soluble in acetone; products soluble in chloroform or in pure methylene chloride from products insoluble in these solvents, etc. These modifications of solubility take place more or less rapidly according to the conditions under which the operation is carried out, particularly according to the temperature at which the treatment is performed, and to the proportion of the alkaline compound present.

The acetic acid, removed from the cellulose acetate during the saponification, is transformed into alkaline acetate. The operation can be controlled with certitude and simplicity by ascertaining analytically the quantity of alkaline compound not transformed into alkaline acetate. It is also possible to predetermine the extent of the saponification and the solubility of the final product. This is attained by using for the reaction the quantity of alkaline compound theoretically required for the desired degree of saponification. These two methods of conducting the operation are particularly advantageous from a technical point of view. Given that, in carrying out the process, the deacetylation is obtained by the action of alkaline compounds and any degradation or, at any rate, any substantial degradation of the cellulosic molecule is avoided, which is not the case in saponification processes where an acid compound is brought in action. It has been also ascertained that the plastic products and films, or filaments obtained from acetates prepared according to the invention have superior mechanical properties.

The following examples, which are not limitative in any way, illustrate how the process may be caried out. The parts are by weight.

*Example I.*—200 parts of cellulose acetate containing approximately 45% of $CH_3CO$ groups, insoluble in acetone and slightly soluble in pure chloroform, are dissolved hot into 500 parts of phenol. To this solution is added, with kneading, a solution of sodium phenate obtained in adding 168 parts of 14% caustic soda to 230 parts of phenol. The mixture is maintained at 60° C. for 3½ hours. 4000 parts of ethyl alcohol are then added to the reacting mass with kneading. The cellulose acetate insoluble in the alcoholic phenol solution is separated by decantation; it is afterwards freed from the phenol it still contains, by grinding first with alcohol and then with water. The cellulose acetate so obtained is soluble in pure acetone. It contains about 38% of $CH_3CO$ groups and its acetonic collodions give strong films.

*Example II.*—200 parts of a cellulose acetate containing about 44% of $CH_3CO$ groups, insoluble in acetone and in acetic acid, are dissolved into a mixture of 680 parts of resorcinol and 120 parts of water. To this solution is added a solution of sodium resorcinate prepared by adding 42 parts of caustic soda (36° Bé.) to 180 parts of resorcinol containing 15% of water. After having kept the mixture at approximatey 60° C. for about 8½ hours, the alkaline reaction has completely, or almost completely, disappeared. Water is then added to the reacting mass with kneading. Cellulose acetate, insoluble in the aqueous resorcinol solution, is separated by decantation; it is freed from the resorcinol it contains by grinding with water and washing with water. The product so obtained contains 40 to 41% of $CH_3CO$ groups; it is soluble in acetic acid, but it is not yet quite soluble in acetone.

By using the same quantity of alkali as in Example I, it is possible to obtain, after a few hours, a product which is soluble in acetone.

In the above examples, the modifications in the solubility of the cellulose acetate may be obtained quicker by working at a higher temperature. One can also dilute the reacting solution by adding a small quantity of alcohol for the purpose of obtaining a less viscous reacting mass.

The above examples are only given as indications of the transformation taking place. I have ascertained that the various degrees of solubility obtained by treating a given cellulose acetate may either be absent or occur in a different order when treating a different cellulose acetate.

This process for treating cellulose acetates may be applied to products obtained by various processes, provided that they are soluble in phenols or polyphenols or in aqueous solutions thereof. It is applicable also to cellulose acetates containing other organic or inorganic radicals, such as sulphoacetates, phosphoacetates, nitroacetates, cellulose formylacetates, etc. It is specially advantageous for the treatment of cellulose acetates obtained by processes in which the acetylating agent is used in the state of a vapour.

I claim:

1. A method which comprises dissolving a cellulose acetate in a phenolic solution and treating said cellulose derivative while in solution with a phenate having an alkaline reaction.

2. A method which comprises dissolving a cellulose acetate in a phenolic solution and treating said cellulose derivative while in solution with an alkali metal phenate.

3. A method which comprises dissolving a cellulose acetate in a phenolic solution containing a phenate having an alkaline reaction.

4. A method which comprises dissolving a cellulose acetate in a phenolic solution containing an alkali metal phenate.

5. A method which comprises dissolving a cellulose acetate in a phenolic solution and treating said cellulose acetate while in solution with a phenate having an alkaline reaction at a temperature of from 30° C. to 70° C.

6. A method of modifying the solubility characteristics of a cellulose acetate which comprises dissolving said cellulose acetate in a phenolic solution and treating said cellulose acetate while in solution with a phenate having an alkaline reaction, the quantity of phenate depending on the degree of saponification desired.

7. A method of modifying the solubility characteristics of a cellulose acetate which comprises dissolving said cellulose acetate in a phenolic solution and treating said cellulose acetate while in solution with a phenate having an alkaline reaction at a temperature of from 30° C. to 70° C., the quantity of phenate depending on the degree of saponification desired.

8. A method of modifying the solubility characteristics of a cellulose acetate which comprises dissolving said cellulose acetate in a phenolic solution and treating said cellulose acetate while in solution with an alkali-metal phenate at a temperature of from 30° C. to 70° C., the quantity of phenate depending on the degree of saponification desired.

9. A method of modifying the solubility characteristics of a cellulose acetate which comprises dissolving said cellulose acetate in a solution containing phenol, treating said cellulose acetate while in solution with sodium phenate, the quantity of phenate depending on the degree of saponification desired.

10. A method of modifying the solubility characteristics of a cellulose acetate which comprises dissolving said cellulose acetate in a solution containing resorcinol, treating said cellulose acetate while in solution with sodium resorcinate, the quantity of sodium resorcinate depending upon the degree of saponification desired.

In testimony whereof, I have affixed my signature to this specification.

AUGUSTE FLORENTIN BIDAUD.